UNITED STATES PATENT OFFICE.

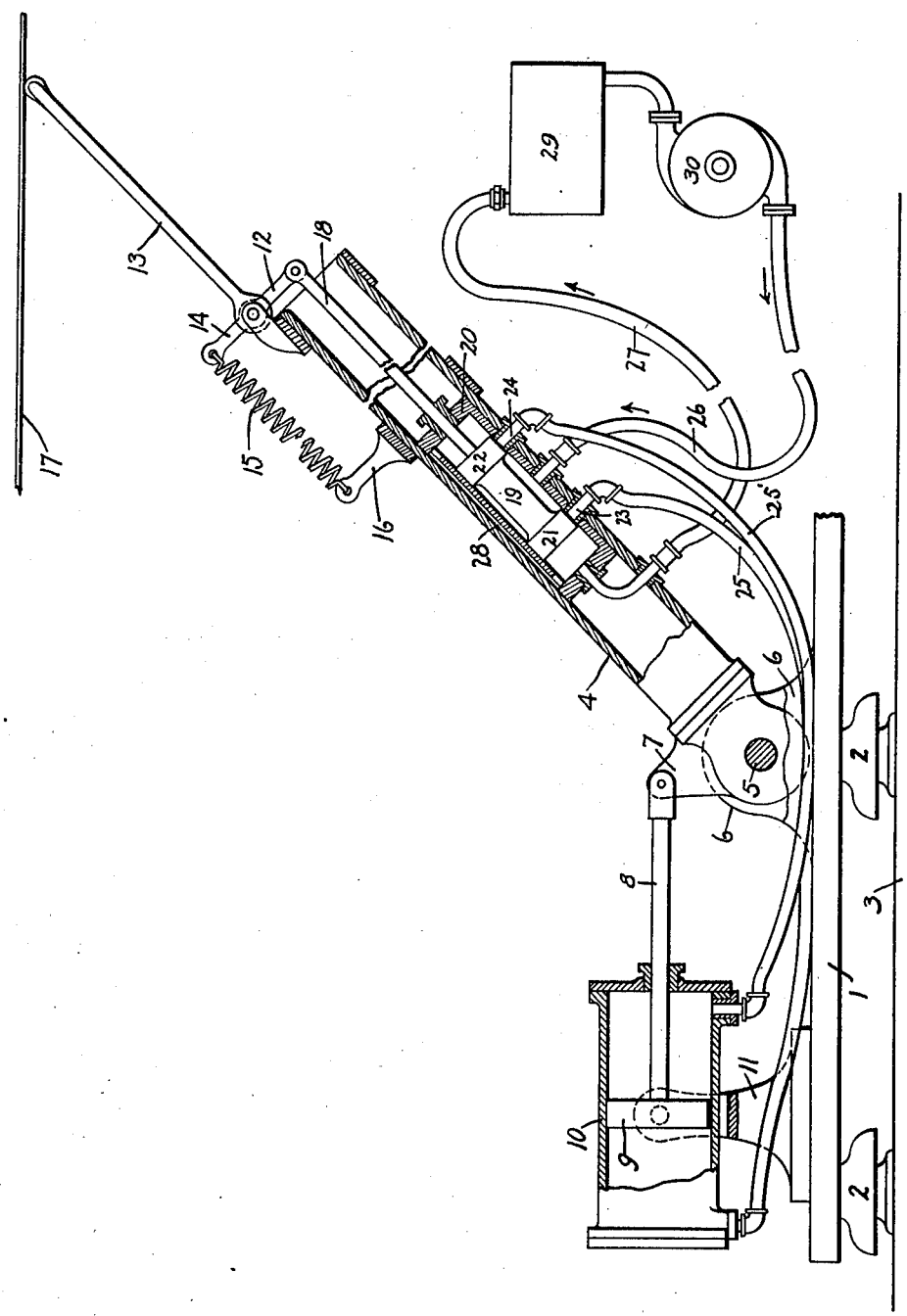

CHARLES E. EVELETH, OF SCHENECTADY, NEW YORK, ASSIGNOR TO GENERAL ELECTRIC COMPANY, A CORPORATION OF NEW YORK.

TROLLEY AND TROLLEY-SUPPORT.

1,003,890.  Specification of Letters Patent.  Patented Sept. 19, 1911.

Application filed August 21, 1908. Serial No. 449,622.

*To all whom it may concern:*

Be it known that I, CHARLES E. EVELETH, a citizen of the United States, residing at Schenectady, county of Schenectady, State of New York, have invented certain new and useful Improvements in Trolleys and Trolley-Supports, of which the following is a specification.

This invention relates to electric railways, and especially to mechanism for supporting a trolley collector and keeping it in contact with an overhead conductor.

The ordinary iron trolley pole is a rigid, heavy affair which has considerable inertia, so that it does not move quickly to accommodate itself to changes in the level of the overhead conductor. On high speed roads this causes the trolley wheel to separate from the conductor at the points where the conductor is suspended and even with the catenary suspension there are more or less troubles of this kind. An ideal construction would be a light whip-like trolley pole which would not have a very heavy pressure against the trolley wire, but would be very active and able to follow instantly any undulation in the wire. Such a device is not practicable for several reasons, especially because it could not successfully follow the wire at points where said wire is elevated considerably above normal in order to cross roads, bridges, etc.

My invention aims to meet these difficulties by providing a rigid carrier movably mounted on the trolley stand and carrying at its upper end a light collector arm such as a trolley pole or bow urged by a spring against the overhead conductor. This pole or bow controls a valve which admits fluid pressure to a cylinder containing a piston which is connected with the carrier and operates to raise or lower the same, depending on the position of the valve. By giving said valve sufficient lap, the pole or bow can swing through a predetermined arc of movement before it opens the ports which admit the fluid pressure to the cylinder. This construction enables the normal swing of the light pole or bow to follow closely the ordinary undulations of the trolley wire, while any great change in level will cause an elevation or depression of the carrier to carry the trolley pole or bow to said higher or lower position.

The accompanying drawing is a somewhat diagrammatic representation of one embodiment of my invention, showing a side elevation, partly in section, of a trolley support and the operating mechanism.

The trolley illustrated is designed for high speed high tension roads, and the base 1 is therefore supported on insulators 2 on the car-top 3. The carrier 4 is represented as a rigid boom, whose heel is hinged on a pin 5 extending transversely between a pair of heavy lugs 6 rising from said base. An arm 7 extends up from said boom, and a piston rod 8 is pivoted to said arm, the piston 9 which it carries being contained in a cylinder 10 mounted on trunnions between standards 11 rising from the base 1, so that said cylinder can rock as the piston travels back and forth, swinging the boom down and up.

The piston is actuated by fluid pressure, preferably an inelastic fluid such as water. The valve controlling the water is operatively connected to a crank 12 attached to the collector arm 13, which is a short light structure pivoted to the upper end of the boom. A crank 14 opposite the crank 12 is attached to one end of a tension spring 15, whose lower end is fastened to the boom or to a stud 16 projecting therefrom. Said spring urges the collector up against the trolley wire 17.

The valve rod 18 is pivotally attached to the crank 12, and runs down to the valve 19 which is located in a valve chest 20, preferably inclosed in the boom itself, which for this purpose may be made tubular. The valve is preferably of the double piston type, each piston 21 22 controlling a port 23 24 which respectively connect by flexible tubes 25 25' with the front and back ends of the cylinder. The pistons have sufficient overlap to permit them to be moved more or less either way from a central position before opening the ports. Water under pressure is led through a flexible pipe 26 to the chamber between the pistons. An escape pipe 27 leads from one end of the valve chest, the spaces at the ends of said chest being in constant communication through a passage 28 in the wall of the chest. The water is drawn from a tank 29 by a suitably-driven circulating pump 30 and forced through the pipe 26, while it returns to said tank through the pipe 27, so that there is no loss in the system.

The operation is as follows: The light collector arm or pole 13 has so little weight and inertia that it readily follows the undulations of the trolley wire 17 even at high speed. Meanwhile the heavy boom 4 remains motionless, being held locked in position by the water on each side of the piston 9. The lap of the pistons 21 22 is sufficient to permit a reasonable play of the bow up and down without opening either of the ports 23 24. But when the trolley wire assumes a higher level than normal, as for instance at a road crossing or a bridge, the crank 12 draws the valve up far enough to admit the water pressure, entering by the supply pipe 26 between the pistons, to the port 24 and the pipe 25′ and thence to the back end of the cylinder 10. At the same time the front end of the cylinder is placed in communication with the escape pipe 27 through the pipe 25, the port 23, and the space below the valve. The water pressure moves the piston 9 toward the front end of the cylinder, pulling up the boom and lifting the bow to the higher level on which it must work. On reaching that level, the valve is again closed, by the return of the collector arm to its normal working position, and the boom remains locked in its elevated position. A return of the trolley wire to or below its normal level will move the valve downward and admit pressure to the front end of the cylinder to drop the boom accordingly.

While I have shown the part which carries the collector arm as a hinged boom, yet it is evident that the carrier may be differently mounted to raise and lower the collector arm at abnormal levels in the trolley wire, without departing from the spirit and scope of my invention.

What I claim as new and desire to secure by Letters Patent of the United States, is:

1. A trolley comprising a carrier, a collector arm pivotally mounted on the outer end thereof, and means controlled by the up and down angular movement of the collector arm to correspondingly raise or lower said carrier.

2. A trolley comprising a pivoted carrier, a collector arm pivotally mounted on the outer end thereof, and means for automatically raising and rigidly maintaining said carrier when the collector arm moves upwardly through a predetermined angle.

3. A trolley comprising a carrier, a collector arm pivotally mounted on the outer end thereof, and means controlled by the up and down angular movement of the collector arm to correspondingly move said carrier and rigidly maintain it in adjusted position.

4. A trolley comprising a pivoted carrier, a collector arm pivotally mounted on the outer end thereof, means controlled by extreme up or down movement of said collector arm to move and rigidly maintain said carrier in a corresponding higher or lower position.

5. A trolley comprising a pivoted carrier, a collector arm pivotally mounted on the outer end thereof, and fluid pressure means for raising and lowering said carrier actuated by extreme movement of the collector arm in the same direction.

6. In a trolley and trolley support, the combination with a boom, of a collector arm pivoted to the outer end thereof, a cylinder and piston in operative engagement with said boom, a supply of inelastic fluid under pressure, and a valve controlled by the up and down movement of said collector arm and acting to admit said fluid to said cylinder to effect a corresponding up or down movement of said boom.

7. In a trolley and trolley support, the combination with a boom, of a collector arm pivoted to the outer end thereof, a cylinder and piston for moving said boom, a supply of water under pressure, and a valve for controlling the supply of water to said cylinder, said valve being carried on the boom and connected with said collector arm whereby extreme up or down movement of the arm effects a corresponding up or down movement of the boom.

8. A trolley and trolley support, comprising a hinged boom, a collector arm pivoted to the upper end thereof and having two cranks, a spring attached to one crank for urging said collector arm upward, a rod attached to the other crank, a valve on said rod, a source of fluid supply controlled by said valve, and means operated thereby for moving said boom, said valve having a certain amount of lap to give the collector arm a certain range of movement without causing any movement of said boom.

9. A trolley and trolley support, comprising a hinged tubular boom, a valve chest in said boom, a double piston valve in said chest, a source of fluid pressure controlled by said valve, a cylinder connected with said valve chest, and a collector arm pivoted to said boom and operatively connected with said valve.

In witness whereof, I have hereunto set my hand this 19th day of August, 1908.

CHARLES E. EVELETH.

Witnesses:
 BENJAMIN B. HULL,
 HELEN ORFORD.

---

Copies of this patent may be obtained for five cents each, by addressing the "Commissioner of Patents, Washington, D. C."